US010106223B2

(12) United States Patent
Usui et al.

(10) Patent No.: US 10,106,223 B2
(45) Date of Patent: Oct. 23, 2018

(54) BICYCLE CONTROL SYSTEM

(71) Applicant: Shimano Inc., Sakai, Osaka (JP)

(72) Inventors: Makoto Usui, Osaka (JP); Takashi Komemushi, Osaka (JP); Taihei Nishihara, Osaka (JP)

(73) Assignee: Shimano Inc., Osaka (JP)

( * ) Notice: Subject to any disclaimer, the term of this patent is extended or adjusted under 35 U.S.C. 154(b) by 66 days.

(21) Appl. No.: 15/187,136

(22) Filed: Jun. 20, 2016

(65) Prior Publication Data

US 2017/0001687 A1    Jan. 5, 2017

(30) Foreign Application Priority Data

Jun. 30, 2015    (JP) ................................ 2015-131899

(51) Int. Cl.
| | |
|---|---|
| *B62M 6/45* | (2010.01) |
| *B62M 6/55* | (2010.01) |
| *B62M 11/16* | (2006.01) |
| *B62M 25/00* | (2006.01) |

(52) U.S. Cl.
CPC ................ *B62M 6/45* (2013.01); *B62M 6/55* (2013.01); *B62M 11/16* (2013.01); *B62M 2025/006* (2013.01)

(58) Field of Classification Search
CPC .......... B62M 6/45; B62M 6/55; B62M 11/16; B62M 2025/006
USPC ......................................................... 701/22
See application file for complete search history.

(56) References Cited

U.S. PATENT DOCUMENTS

| | | | | |
|---|---|---|---|---|
| 5,213,548 A | * | 5/1993 | Colbert ................. | B62M 25/08 280/238 |
| 5,254,044 A | * | 10/1993 | Anderson .............. | B62M 9/122 474/103 |
| 5,261,858 A | * | 11/1993 | Browning .............. | B62M 9/122 474/69 |
| 5,599,244 A | * | 2/1997 | Ethington .............. | B62M 9/122 280/261 |
| 5,971,116 A | * | 10/1999 | Franklin ............ | B60G 17/0152 188/266.2 |
| 8,779,942 B1 | * | 7/2014 | Potter .................... | G08G 1/042 340/933 |
| 2003/0071437 A1 | | 4/2003 | Takeda | |
| 2004/0112161 A1 | * | 6/2004 | Takamoto .............. | B62M 25/04 74/473.13 |

(Continued)

FOREIGN PATENT DOCUMENTS

| | | |
|---|---|---|
| JP | H10511621 A | 11/1998 |
| JP | 2003-120803 A | 4/2003 |
| JP | 2008-074118 A | 4/2008 |

*Primary Examiner* — Anne M Antonucci
*Assistant Examiner* — James E Stroud
(74) *Attorney, Agent, or Firm* — Global IP Counselors, LLP

(57) ABSTRACT

A bicycle control system is provided that is configured to control a bicycle component using a threshold value that is appropriate for the rider. The bicycle control system includes a controller for controlling a bicycle component based on a threshold value and a parameter related to a running state of a bicycle. The controller changes the threshold value when an operating unit is operated, and the change amount of the threshold value when the operating unit is operated is determined based on an operating state of the operating unit.

18 Claims, 10 Drawing Sheets

(56) References Cited

U.S. PATENT DOCUMENTS

| | | | |
|---|---|---|---|
| 2011/0131005 A1* | 6/2011 | Ueshima | A63B 24/0062 |
| | | | 702/141 |
| 2014/0176076 A1* | 6/2014 | Momo | H01M 10/46 |
| | | | 320/128 |
| 2015/0003087 A1* | 1/2015 | Futamura | B60Q 1/143 |
| | | | 362/466 |
| 2016/0121730 A1* | 5/2016 | Fujita | B60L 11/18 |
| | | | 701/22 |

* cited by examiner

BICYCLE CONTROL SYSTEM

CROSS-REFERENCE TO RELATED APPLICATIONS

This application claims priority to Japanese Patent Application No. 2015-131899, filed on Jun. 30, 2015. The entire disclosure of Japanese Patent Application No. 2015-131899 is hereby incorporated herein by reference.

BACKGROUND

Field of the Invention

The present invention relates to a bicycle control system.

Background Information

Conventionally, a bicycle control system is known that comprises a controller for controlling a bicycle component of a bicycle using a parameter related to the running state of a bicycle. For example, a bicycle control system is disclosed in Japanese Unexamined Patent Application Publication No. 1998-511621 hat compares the rotational frequency of the crank with a threshold value and controls an electric transmission, which is a bicycle component, so that the rotational frequency of the crank is maintained within a predetermined range.

SUMMARY

Meanwhile, it has been found that a favorable crank rotational frequency is different depending on the rider. However, in the bicycle control system described above, the threshold value is constant, so the crank rotational frequency is maintained within a constant predetermined range, leaving room for improvement in usability. The above is not limited to an electric transmission; the same type of problem can occur in a bicycle component that is operated based on a threshold value that is set in advance and a parameter related to the running state of a bicycle.

An object of the present invention is to provide a bicycle control system that is able to control a bicycle component using a threshold value that is appropriate for the rider.

The bicycle control system according to one embodiment of the present invention comprises a controller configured to control a bicycle component based on a threshold value and a parameter related to a running state of a bicycle, wherein the controller is configured to change the threshold value when an operating unit is operated by a change amount that is determined based on an operating state of the operating unit.

According to one embodiment of the bicycle control system, the operating unit comprises a first operating unit and a second operating unit, and the controller is configured to decrease the threshold value when the first operating unit is operated and increase the threshold value when the second operating unit is operated.

According to one embodiment of the bicycle control system, the controller is configured to count up the number of times that one of the first operating unit and the second operating unit has been operated, from the time when one of the first operating unit and the second operating unit is operated until the other of the first operating unit and the second operating unit is operated.

According to one embodiment of the bicycle control system, the controller is configured to initialize the number of times that one of the first operating unit and the second operating unit has been operated, when the other of the first operating unit and the second operating unit is operated after one of the first operating unit and the second operating unit is inputted.

According to one embodiment of the bicycle control system, the change amount of the threshold value is determined based on at least one from among an operation number of times of the operating unit, an operation time of the operating unit, and an operation amount of the operating unit.

According to one embodiment of the bicycle control system, the change amount of the threshold value is determined based on the operation number of times of the operating unit, and the controller increases an absolute value of the change amount of the threshold value as the number of times that the first operating unit has been inputted is increased, when the first operating unit is consecutively operated, and increases the absolute value of the change amount of the threshold value as the number of times that the second operating unit has been operated is increased, when the second operating unit is consecutively operated.

According to one embodiment of the bicycle control system, the threshold value includes a first value, and a second value that is smaller than the first value, and the controller is configured to decrease at least one of the first value and the second value when the first operating unit is operated and increase at least one of the first value and the second value when the second operating unit is operated.

According to one embodiment of the bicycle control system, the controller is configured to change the first value and the second value so that the change amount of the first value and the change amount of the second value become equal, when the first operating unit is operated, and change the first value and the second value so that the change amount of the first value and the change amount of the second value become equal, when the second operating unit is operated.

According to one embodiment of the bicycle control system, the bicycle component is an electric transmission that changes the gear ratio of the bicycle.

According to one embodiment of the bicycle control system, the parameter related to the running state of the bicycle is a vehicle speed of the bicycle, and the controller is configured to control the electric transmission so that the gear ratio of the bicycle is increased when the vehicle speed of the bicycle is greater than or equal to the first value, and control the electric transmission so that the gear ratio of the bicycle is decreased when the vehicle speed of the bicycle is less than or equal to the second value.

According to one embodiment of the bicycle control system, the parameter related to the running state of the bicycle is a crank rotational frequency of the bicycle, and the controller is configured to control the electric transmission so that the gear ratio of the bicycle is increased when the crank rotational frequency of the bicycle is greater than or equal to the first value, and control the electric transmission so that the gear ratio of the bicycle is decreased when the crank rotational frequency of the bicycle is less than or equal to the second value.

According to one embodiment of the bicycle control system, the controller is configured to control the electric transmission so that the gear ratio of the bicycle is increased when the first operating unit is operated, and control the electric transmission so that the gear ratio of the bicycle is decreased when the second operating unit is operated.

According to one embodiment of the bicycle control system, the controller is configured to prevent the electric transmission from operating until a predetermined period has elapsed after causing the electric transmission to operate to change the gear ratio.

One embodiment of the bicycle control system further comprises an assist motor for assisting a manual drive force which is inputted to the bicycle, wherein the controller comprises a plurality of control modes having different magnitudes of a torque of the assist motor with respect to the manual drive force, and, when changing the control mode, the controller is configured to correct the first value and the second value in accordance with the control mode.

According to one embodiment of the bicycle control device, the first value and the second value are corrected to become smaller when in the control mode in which the torque of the assist motor with respect to the manual drive force is larger.

According to one embodiment of the bicycle control system, the bicycle component is an assist motor for assisting a manual drive force that is inputted to the bicycle.

According to one embodiment of the bicycle control system, the parameter related to the running state of the bicycle is a traveling load of the bicycle, and the controller is configured to control the assist motor so that the torque of the assist motor is increased when the traveling load of the bicycle is greater than the first value, and control the assist motor so that the torque of the assist motor is decreased when the traveling load of the bicycle is less than the second value.

According to one embodiment of the bicycle control system, the controller is configured to control the assist motor so that the torque of the assist motor is decreased if the first operating unit is operated when the traveling load of the bicycle is within a range from the first value to the second value, and is configured to control the assist motor so that the torque of the assist motor is increased if the second operating unit is operated when the traveling load of the bicycle is within a range from the first value to the second value.

The bicycle control system of the present invention is able to control a bicycle component using a threshold value that is appropriate for the rider.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
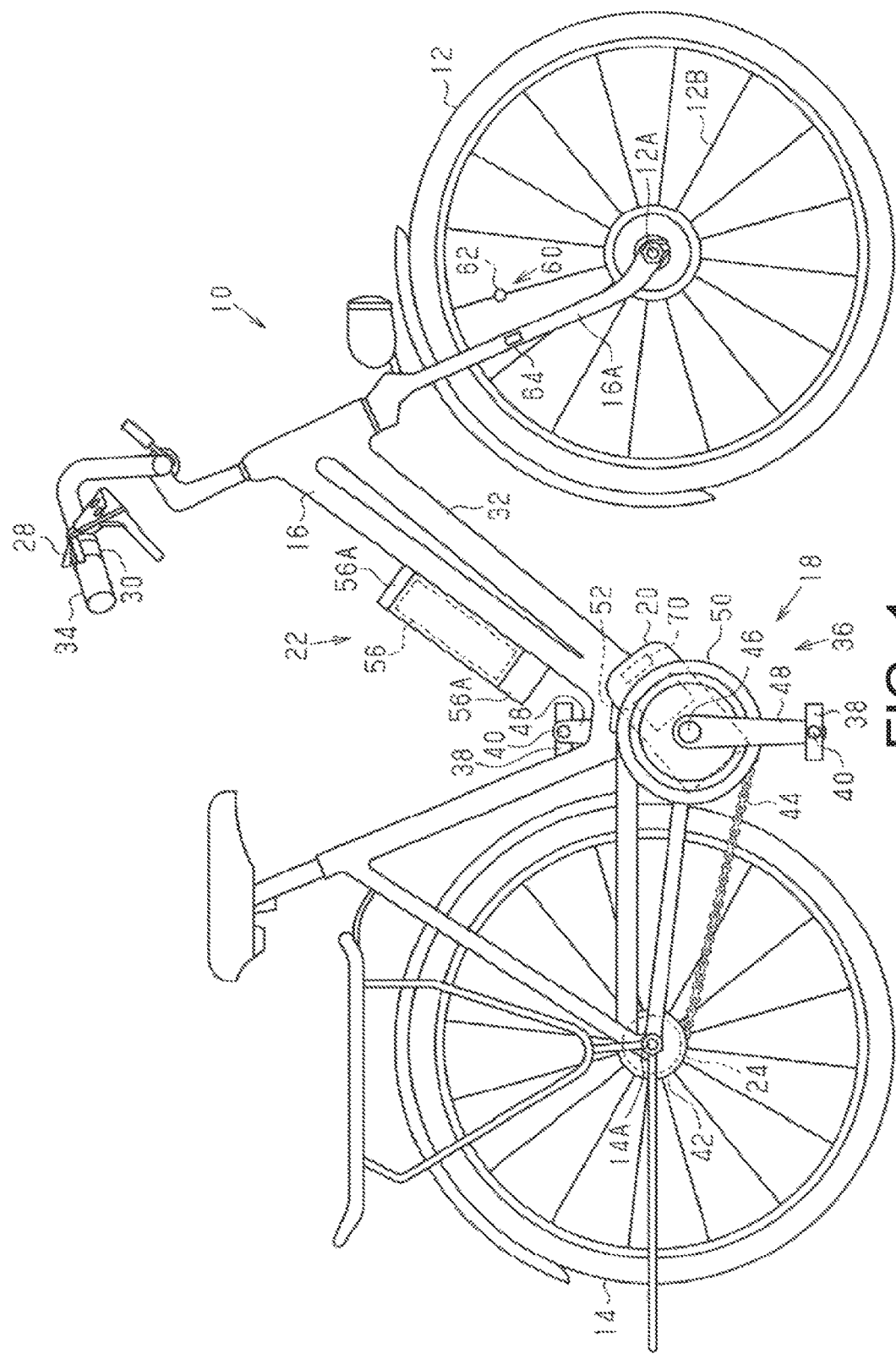
FIG. 1 is a side elevational view of a bicycle equipped with of a bicycle control system in accordance with a first embodiment.

Referring initially to FIG. 1, a configuration of a bicycle 10 is illustrated that is equipped with a bicycle control system in accordance with selected illustrated embodiments. The bicycle 10 comprises a front wheel 12, a rear wheel 14, a vehicle body 16, a drive mechanism 18, an assist mechanism 20, a battery unit 22, an electric transmission 24, a torque sensor 26 (refer to FIG. 2), a gear shift operating unit 28, an assist operating unit 30 and a bicycle control system 70. The electric transmission 24 is a bicycle component.

The vehicle body 16 comprises a frame 32, a handlebar 34 and a front fork 16A. The handlebar 26 is detachably connected to the frame 32. The front fork 16A is connected to the frame 32. The front fork 16A is supported to the frame 32 and connects the handlebar 34 and an axle 12A of the front wheel 12.

The drive mechanism 18 comprises a crank assembly 36, a pair of (left and right) pedals 38, a pair of (left and right) pedal shafts 40, a rear sprocket 42 and a chain 44. The crank assembly 36 comprises a crankshaft 46, a pair of (left and right) crank arms 48 and a front sprocket 50. The crankshaft 46 is rotatably supported to the frame 32. The front sprocket 50 is connected to the crankshaft 46. The left and right crank arms 48 are attached to the crankshaft 46. The left and right pedals 38 are attached to the crank arms 48 so as to be rotatable around the pedal shafts 40.

The front sprocket 50 is coupled to the crankshaft 46. The front sprocket 50 is provided coaxially with the crankshaft 46. The front sprocket 50 can be coupled so that it will not rotate relatively with the crankshaft 46, or be coupled via a one-way clutch (not shown) so that the front sprocket 50 will also roll forward when the crankshaft 46 rolls forward.

The rear sprocket 42 is rotatably attached to the rear wheel 14 around an axle 14A of the rear wheel 14. The rear sprocket 42 is coupled with the rear wheel 14 via the one-way clutch (not shown). The chain 44 is wound to the front sprocket 50 and the rear sprocket 42. When the crank shaft 46 is rotated by the manual drive force that is applied to the pedals 38, the rear wheel 14 is rotated by the front sprocket 50, the chain 44, and the rear sprocket 42.

Figure 2:
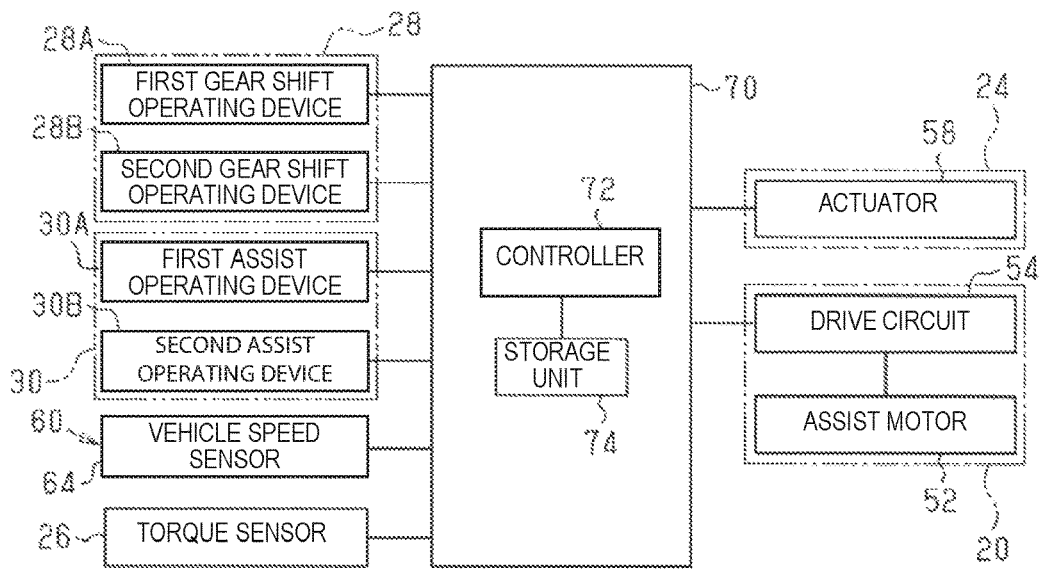
FIG. 2 is a block view of bicycle control system that is mounted on the bicycle in FIG. 1.

The assist mechanism 20 comprises an assist motor 52 and a drive circuit 54 (refer to FIG. 2). The assist motor 52 assists the manual drive force that is inputted to the bicycle 10. In other words, the assist mechanism 20 assists the manual drive force which rotates the front sprocket 50 with the drive of the assist motor 52. The assist mechanism 20 drives the assist motor 52 according the manual drive force that is detected by the torque sensor 26 (refer to FIG. 2). The assist motor 52 is an electric motor. The rotation of the motor 52 is transmitted to the front sprocket 50 via a reduction gear which is not shown. A one-way clutch (not shown) can be provided between the assist motor 52 and the front sprocket 50 for preventing the assist motor 52 from being rotated by the manual drive force when the crank arms 48 rotates forward.

The battery unit 22 comprises a battery 56 and a battery holder 56A. The battery holder 56A is configured to detachably attach the battery 56 to the frame 32. The battery 56 includes one or a plurality of battery cells. The battery 56 is formed of a rechargeable battery. The battery 56 is electrically connected to the assist motor 52 and supplies electric power to the assist motor 52.

The electric transmission 24 shifts a rotation that is inputted to the rear sprocket 42 and transmits the same to the rear wheel 14. The electric transmission 24 changes the gear ratio γ of the bicycle 10. The electric transmission 24 is an internal transmission that is integrated with a hub of the axle 14A of the rear wheel 14. The electric transmission 24 comprises an actuator 58 (refer to FIG. 2) and a planetary gear mechanism. The electric transmission 24 changes the gear ratio γ of the bicycle 10 in a stepwise manner, with the coupled state of the gears that configure the planetary gear mechanism inside the electric transmission 24 being changed by the actuator 58 (refer to FIG. 2) being driven.

The gear shift operating unit 28 is attached to the handlebar 34. As shown in FIG. 2, the gear shift operating unit 28 comprises a first gear shift operating device 28A and a second gear shift operating device 28B. The gear shift operating unit 28 is an operating unit. The first gear shift operating device 28A is a first operating device or first shifter. The second gear shift operating device 28B is a second operating device or second shifter. The gear shift operating unit 28 is electrically connected to a controller 72 of the control system 70 by a cable. When the first gear shift operating device 28A is operated by a rider, the gear shift operating unit 28 transmits an upshift signal to the controller 72. An upshift is a shifting in the direction in which the gear ratio γ becomes larger. When the second gear shift operating device 28B is operated by the rider, the gear shift operating unit 28 transmits a downshift signal to the controller 72. A downshift is a shifting in which the gear ratio γ becomes smaller. It is also possible to connect the gear shift operating unit 28 and the controller 72 so as to communicate via wireless communications.

As shown in FIG. 1, the assist operating unit 30 is attached to the handlebar 34. As shown in FIG. 2, the assist operating unit 30 comprises a first assist operating device 30A and a second assist operating device 30B. The assist operating unit 30 is electrically connected to the controller 72 (refer to FIG. 2) of the control system 70 by a cable. When the assist operating unit 30 is operated by a rider, the assist operating unit 30 transmits an assist up signal or an assist down signal to the controller 72 (refer to FIG. 2). It is also possible to connect the assist operating unit 30 and the controller 72 (refer to FIG. 2) so as to be communicable via wireless communication.

A vehicle speed detection device 60 shown in FIG. 1 detects the rotation of the front wheel 12. The vehicle speed detection device 60 comprises a magnet 62 that is attached to the spokes 12B of the front wheel 12 and a vehicle speed sensor 64 that is attached to the front fork 16A. The vehicle speed detection device 60 is fixed to the vehicle body 16 by bolts and nuts, a band, or the like. The vehicle speed detection device 60 can be configured to detect the rotation of the rear wheel 14 as well. In this case, the vehicle speed sensor 64 is fixed to a chain stay of the frame 32 or a housing of the assist mechanism 20.

The vehicle speed sensor 64 is electrically connected to the controller 72 (refer to FIG. 2) by a cable. The vehicle speed sensor 64 comprises an element (not shown) that outputs a value corresponding to changes in the relative position with the magnet 62. The element is, for example, a magnetic reed that configures a reed switch, a Hall Effect element, or the like. The vehicle speed sensor 64 outputs the output of the element (not shown) to the controller 72. That is, the vehicle speed sensor 64 outputs a signal that reflects the vehicle speed V of the bicycle 10. The controller 72 is configured (programmed) to calculate the travel distance per unit of time (hereinafter referred to as "vehicle speed V") calculated based on the circumferential length of the front wheel 12, which is stored in advance.

Figure 3:
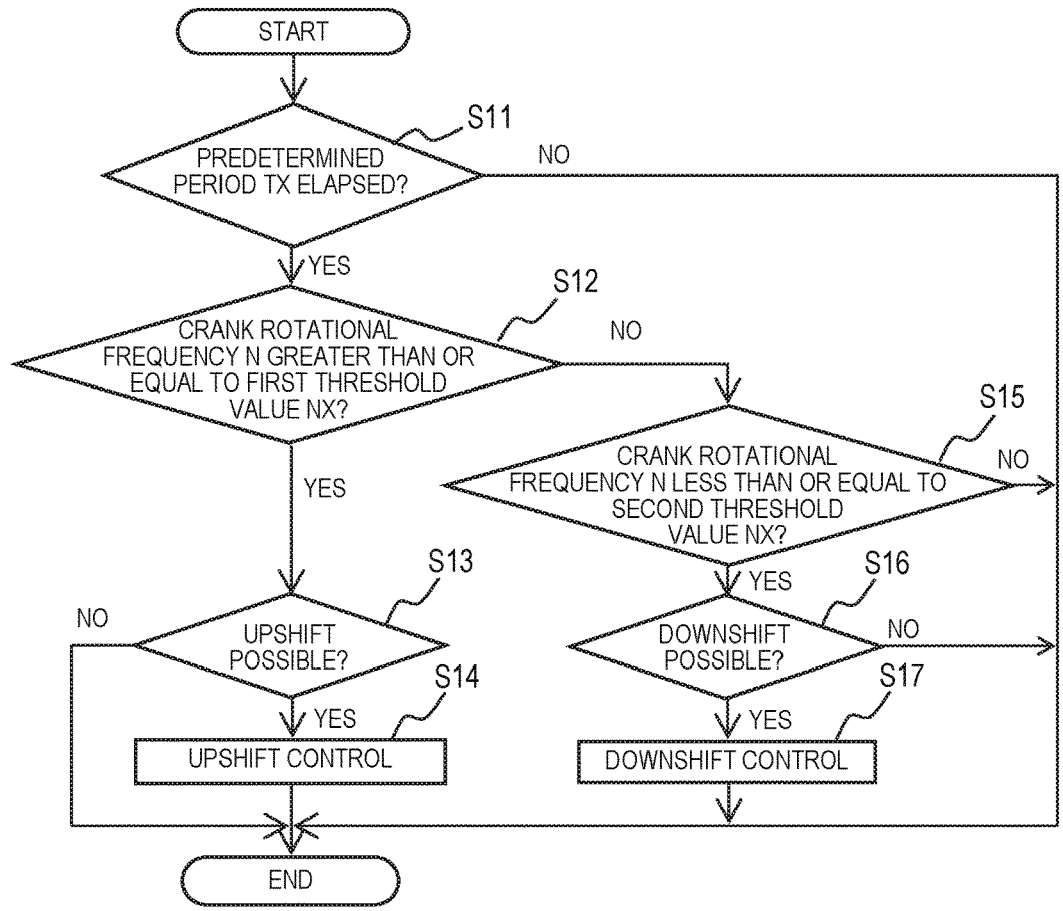
FIG. 3 is a flowchart of the shifting process executed by the controller of FIG. 2.

As shown in FIG. 3, the control system 70 comprises the controller 72 for carrying out various calculations. The control system 70 preferably comprises a storage unit 74. The controller 70 also preferably includes other conventional components such as an input interface circuit, an output interface circuit. The controller 70 is preferably a microcomputer which includes a one or more processors. The storage unit 74 is preferably any memory device (i.e., a non-transitory computer readable medium such as a ROM (Read Only Memory) device and a RAM (Random Access Memory) device, hard disk, etc.). The storage unit 74 is configured to store programming, data, calculations and/or results. In the illustrated embodiment, the storage unit 74 has an automatic shifting program prestored therein for shifting the electric transmission 24. The controller 70 is provided to a housing of the assist mechanism 20 (refer to FIG. 1). The controller 72 calculates the rotational frequency of the crankshaft 46 per unit of time (hereinafter referred to as "crank rotational frequency N") based on the output of the vehicle speed sensor 64. The crank rotational frequency N is a parameter representing the running state of the bicycle 10.

The controller 72 controls the electric transmission 24 based on a threshold value and the crank rotational frequency N of the bicycle 10. The threshold value includes a first value NX, and a second value NY that is smaller than the first value NX. The first value NX and the second value NY are stored in the storage unit 74. The controller 72 executes an upshift control to increase the gear ratio γ, or, a downshift control to decrease the gear ratio γ, based on a comparison result between the crank rotational frequency N and the first value NX as well as the second value NY.

The shifting process that is executed by the controller 72 is described with reference to FIG. 3. The present steps are repeatedly executed every predetermined cycle while power is being supplied to the controller 72. The controller 72 can allow switching between a manual transmission mode and an automatic transmission mode. When the automatic transmission mode is set, the controller 72 is capable of controlling the electric transmission 24. When the manual transmission mode is set, the controller 72 controls the electric transmission 24 based only on an operation signal from the operating unit 28. That is, in the manual transmission mode, the controller 72 controls the electric transmission 24 based only on an operation of the rider. The present steps can be executed only when the controller 72 is in the automatic transmission mode. In this case, the automatic transmission mode can be set by operating the first assist operating device 30A or the second assist operating device 30B of the assist operating unit 30, or a mode changing switch.

In Step S11, the controller 72 determines whether or not a predetermined period TX has elapsed after the electric transmission 24 is operated to change the gear ratio γ. When the predetermined period TX has elapsed, the controller 72 proceeds to Step S12. When the predetermined period TX has not elapsed, the controller 72 ends the present step. That is, the controller 72 prevents the electric transmission 24 from operating until a predetermined period TX has elapsed after the electric transmission 24 is operated to change the gear ratio γ.

The controller 72 determines whether or not the crank rotational frequency N is greater than or equal to the first value NX in Step S12. When the crank rotational frequency N is greater than or equal to the first value NX, the controller 72 proceeds to Step S13. In Step S13, the controller 72 determines whether or not upshift is possible. If upshift is determined to be possible, then an upshift control is executed in Step S14 for controlling the electric transmission 24 so that the gear ratio γ is increased, and the present step is ended. When the current gear ratio is not the maximum gear ratio γ that can be realized by the electric transmission 24, the controller 72 determines that upshift is possible. When the controller 72 determines that upshift is not possible in Step S13, the present step is ended.

If the crank rotational frequency N is less than the first value NX, then the controller 72 determines whether or not the crank rotational frequency N is less than or equal to the second value NY, in Step S15. When the crank rotational frequency N is less than or equal to the second value NY, the controller 72 proceeds to Step S16. In Step S16, the controller 72 determines whether or not downshift is possible. If downshift is determined to be possible, then a downshift control is executed in Step S17 for controlling the electric transmission 24 so that the gear ratio γ is decreased, and the present step is ended. When the current gear ratio γ is not the minimum gear ratio γ that can be realized by the electric transmission 24, the controller 72 determines that downshift is possible. When the controller 72 determines that downshift is not possible in Step S16, the present step is ended.

If the crank rotational frequency N is greater than the second value NY in Step S14, that is, if the crank rotational frequency N falls within the range from the first value NX to the second value NY, then the controller 72 does not carry out an upshift control or a downshift control, and ends the present step.

When the first gear shift operating device 28A is operated, the controller 72 controls the electric transmission 24 so that the gear ratio γ is increased. When the second gear shift operating device 28B is operated, the controller 72 controls the electric transmission 24 so that the gear ratio γ is increased.

When the gear shift operating unit 28 is operated, the controller 72 changes the threshold value. More specifically, the controller 72 decreases the first value NX and the second value NY when the first gear shift operating device 28A is operated, and increases the first value NX and the second value NY when the second gear shift operating device 28B is operated. When the first gear shift operating device 28A is operated, the controller 72 changes the first value NX and the second value NY so that the change amount D of the first value NX and the change amount D of the second value NY become equal. When the second gear shift operating device 28B is operated, the controller 72 changes the first value NX and the second value NY so that the change amount D of the first value NX and the change amount D of the second value NY become equal.

The specific direction of change of the threshold value of the controller 72 will be described. A crank rotational frequency NA is stored in the storage unit 74 as a reference. The crank rotational frequency NA as the reference is, for example, 60 rpm. The controller 72 controls the transmission 24 so as to maintain a predetermined rotational frequency range that includes the crank rotational frequency NA as the reference (NA−NM to NA+NM rpm). "NM" is, for example, "10." Therefore, in the initial state, the controller 72 sets the first value NX to "NA+NM," and sets the second value NY to "NA−NM." "NM" can be configured to be settable by one or both of the operating units 28 and 30 or by an external device. The controller 72 changes the first value NX and the second value NY, by changing the crank rotational frequency NA as the reference according to the change amount D.

Further, the change amount D of the threshold value is determined based on the operating state of the gear shift operating devices 28A and 28B. In the present embodiment, the operating state of the gear shift operating devices 28A, 28B is the operation number of times of the gear shift operating devices 28A and 28B. Accordingly, the change amount D of the threshold value when the gear shift operating devices 28A and 28B are operated is determined based on the operation number of times of the gear shift operating devices 28A and 28B. That is, when the gear shift operating devices 28A and 28B are operated, the controller 72 changes the first value NX and the second value NY based on the number of times that the gear shift operating devices 28A and 28B have been operated. Specifically, when the first gear shift operating device 28A is consecutively operated, the controller 72 increases the absolute value of the change amount D of the first value NX and the second value NY, as the number of times that the first gear shift operating device 28A has been inputted is increased. When the second gear shift operating device 28B is consecutively operated, the controller 72 increases the absolute value of the change amount D of the first value NX and the second value NY, as the number of times that the second gear shift operating device 28B has been inputted is increased.

The controller 72 counts up the number of times that one of the first gear shift operating device 28A and the second gear shift operating device 28B has been operated, from the time when one of the first gear shift operating device 28A and the second gear shift operating device 28B is operated until the other of the first gear shift operating device 28A and the second gear shift operating device 28B is operated. Then, the controller 72 initializes the number of times that one of the first gear shift operating device 28A and the second gear shift operating device 28B has been operated, when the other of the first gear shift operating device 28A and the second gear shift operating device 28B is operated after one of the first gear shift operating device 28A and the second gear shift operating device 28B is inputted.

The steps of changing the threshold value will be described with reference to FIG. 4. The controller 72 determines whether or not an upshift signal has been inputted from the gear shift operating device 28 (refer to FIG. 2) in Step S21. When an upshift signal has been inputted, the controller 72 executes an upshift control in Step S22. When the current gear ratio is the maximum gear ratio γ that can be realized by the electric transmission 24, the controller 72 maintains the current gear ratio γ in Step S22.

The controller 72 counts up the number of times that an upshift signal has been inputted in Step S23. The controller 72 initializes the count of the number of times that a downshift signal has been inputted in Step S24. The controller 72 changes the first value NX and the second value NY to be smaller, based on the count of the number of times that an upshift signal has been inputted, in Step S25. The change amount D of the first value NX and the second value NY are, for example, set to be doubled each time the count is increased by "1." The change amount D of the first value NX and the second value NY are, for example, "−0.5 rpm" when the count is "1," "−1 rpm" when "2," "−2 rpm" when "3," and "−4 rpm" when "4."

If an upshift signal is determined to not have been inputted in Step S21, then the controller 72 determines whether or not a downshift signal has been inputted from the gear shift operating unit 28 (refer to FIG. 2) in Step S26. If a downshift signal is determined to not have been inputted in Step S26, then the controller 72 ends the present step.

When a downshift signal has been inputted, the controller 72 executes a downshift control in Step S27. When the current gear ratio is the minimum gear ratio γ that can be realized by the electric transmission 24, the controller 72 maintains the current gear ratio γ in Step S27.

The controller 72 counts up the number of times that a downshift signal has been inputted in Step S28. The controller 72 clears the count of the number of times that an upshift signal has been inputted in Step S29. The controller 72 changes the first value NX and the second value NY to be larger, based on the count of the number of times that a downshift signal has been inputted, in Step S30. The change amount D of the first value NX and the second value NY are, for example, set to be doubled each time the count is increased by "1." The change amount D of the first value NX and the second value NY are, for example, "+0.5 rpm" when the count is "1," "+1 rpm" when "2," "+2 rpm" when "3," and "+4 rpm" when "4."

The controller 72 accumulates and stores the change amount D of the first value NX and the second value NY. That is, if the first value NX and the second value NY are decreased by a change amount D1 after which the changed first value NX and second value NY are increased by a change amount D2, then the controller 72 stores "D1+D2" as the change amount D in the storage unit 74.

Figure 5:
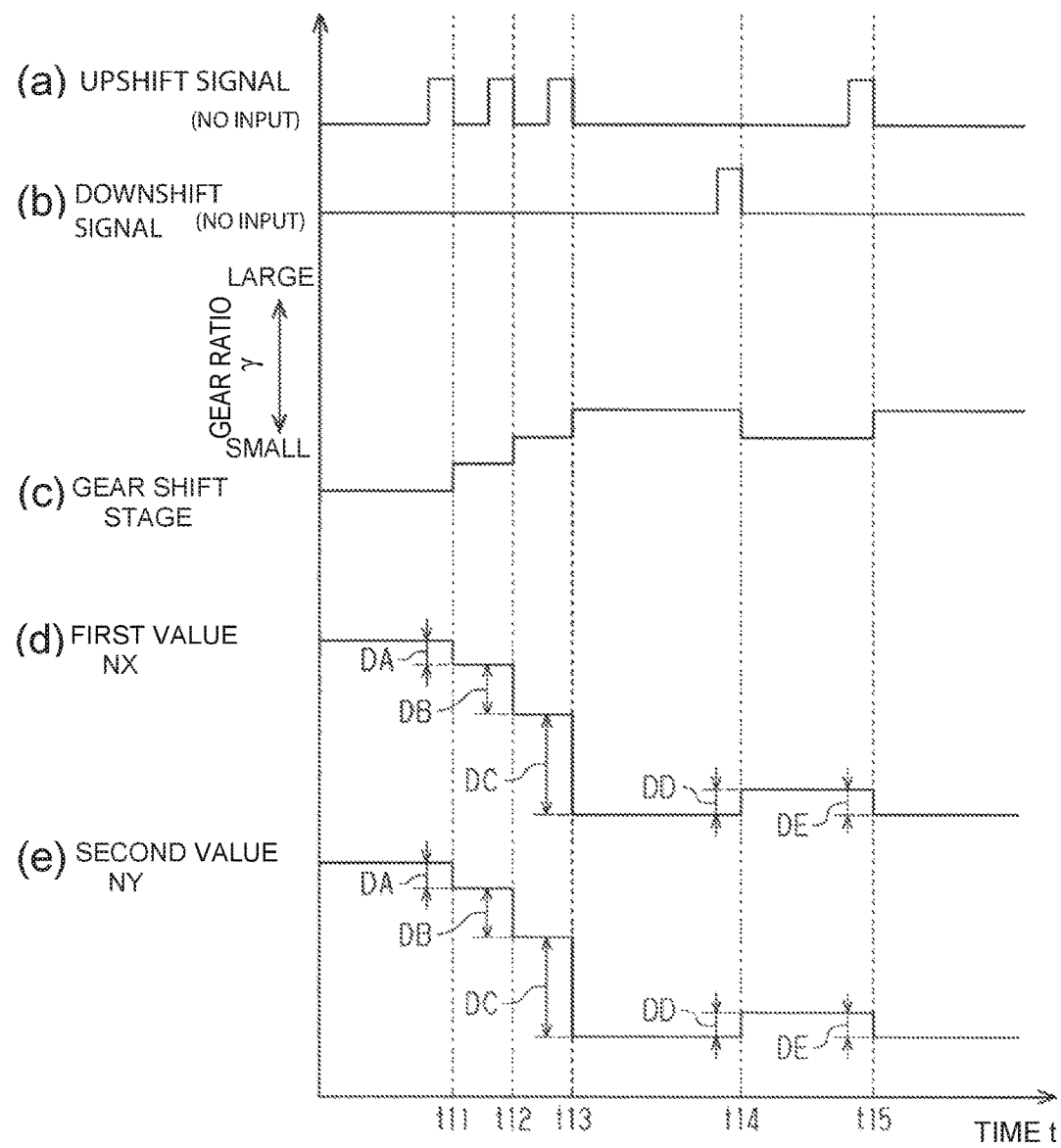
FIG. 5 is a timing chart showing an example of an execution mode of the steps of changing the threshold value of FIG. 3.

One example of the execution mode of the change steps will be described with reference to FIG. 5. Time t11 indicates the time at which an upshift signal is inputted to the controller 72 and the count of the number of times that an upshift signal has been inputted becomes "1." At this time, the controller 72 increases the gear shift stage by one stage. Further, the controller 72 changes the first value NX and the second value NY to be smaller.

Time t12 indicates the time at which an upshift signal is inputted to the controller 72 and the count of the number of times that an upshift signal has been inputted becomes "2." At this time, the controller 72 increases the gear shift stage by one stage. Further, the controller 72 changes the first value NX and the second value NY to be smaller. The change amount DB of the first value NX and the second value NY at time t12 is greater than the change amount DA at time t11.

Time t13 indicates the time at which an upshift signal is inputted to the controller 72 and the count of the number of times that an upshift signal has been inputted becomes "3." At this time, the controller 72 increases the gear shift stage by one stage. Further, the controller 72 changes the first value NX and the second value NY to be smaller. The change amount DC of the first value NX and the second value NY at time t13 is greater than the change amount DB at time t12.

Time t14 indicates the time at which a downshift signal is inputted to the controller 72 and the count of the number of times that a downshift signal has been inputted becomes "1." At this time, the controller 72 decreases the gear shift stage by one stage. Further, the controller 72 initializes the count of the number of times that an upshift signal has been inputted to "0." In addition, the controller 72 changes the first value NX and the second value NY to be larger. The change amount DD of the first value NX and the second value NY at time t14 is equal to the change amount DA at time t11.

Time t15 indicates the time at which an upshift signal is inputted to the controller 72 and the count of the number of times that an upshift signal has been inputted becomes "1." At this time, the controller 72 initializes the count of the number of times that a downshift signal has been inputted to "0." At this time, the controller 72 increases the gear shift stage by one stage. Further, the controller 72 changes the first value NX and the second value NY to be smaller. The change amount DE of the first value NX and the second value NY at time t15 is equal to the change amount DA at time t11.

The controller 72 comprises a plurality of control modes having different magnitudes of the torque τ of the assist motor 52 with respect to the manual drive force. The plurality of modes include a first mode, a second mode in which the toque τ with respect to the manual drive force is larger than the first mode, and a third mode in which the torque τ with respect to the manual drive force is larger than the second mode. Further, the plurality control modes further includes a control mode in which the assist motor 52 does not perform an assist. The controller 72 switches the control mode based on an assist up signal and an assist down signal from the gear shift operating unit 28. When changing the control mode, the controller 72 corrects the first value NX and the second value NY according to the control mode. The first value NX and the second value NY are corrected to become smaller when in a control mode in which the torque τ with respect to the manual drive force is larger.

The switching steps of the control mode of the assist mechanism 20 will be described with reference to FIG. 6. The controller 72 determines whether or not an assist up signal has been inputted in Step S41. When an assist up signal has been inputted, the controller 72 changes to a control mode in which the torque τ with respect to the manual drive force is large in Step S42, and proceeds to Step S43. For example, if an assist up signal is inputted when the first mode is set, then the control mode is changed to the second mode. When set to the control mode in which the torque τ with respect to the manual drive force is the largest in Step S42, the controller 72 maintains the control mode in which the torque τ with respect to the manual drive force is the largest. The controller 72 corrects the first value NX and the second value NY to be smaller in Step S43.

The specific direction of correction of the threshold value of the controller 72 will be described. The controller 72 changes the crank rotational frequency NA as the reference according to the control mode. A change amount E of the threshold value corresponding to each control mode is stored in the storage unit 74. For example, when the third mode is the reference, the change amount E of the threshold value in the third mode is "0," the change amount E of the threshold value in the second mode is "−E2," the change amount E of the threshold value in the first mode is "−E1," and the change amount E of the threshold value in the control mode in which the assist motor 52 does not perform an assist is "−E0." E0, E1, and E2 are positive values chosen to have the relationship: E0>E1>E2. E0, E1, and E2 can be configured to be settable by one or both of the operating units 28 and 30 or by an external device. For example, "2" is selected for E2, "4" is selected for E1, and "6" is selected for E0. Therefore, the crank rotational frequency NA which becomes the reference in the first mode will be "NA−E1," the crank rotational frequency NA which becomes the reference in the second mode will be "NA−E2," the crank rotational frequency NA which becomes the reference in the third mode will be "NA," and the crank rotational frequency NA which becomes the reference in the mode without assist will be "NA−E0."

The controller 72 can correct the first value NX and the second value NY to be smaller by multiplying a value less than "1" to the first value NX and the second value NY, or, by subtracting a predetermined value from the first value NX and the second value NY as well.

If an assist up signal has not been inputted in Step S41, then the controller 72 proceeds to Step S44, and the controller 72 determines whether or not an assist down signal has been inputted. When an assist down signal has been inputted, the controller 72 changes to a control mode in which the torque t with respect to the manual drive force is small in Step S45, and proceeds to Step S46. For example, if an assist down signal is inputted when the third mode is set, then the control mode is changed to the second mode. When set to the control mode in which the torque τ with respect to the manual drive force is the smallest in Step S45, the controller 72 can maintain the control mode in which the torque t with respect to the manual drive force is the smallest, or change to a control mode in which the assist motor 52 does not perform an assist. When a control mode in which the assist motor 52 does not perform an assist is set, the control mode in which the assist motor 52 does not perform an assist is maintained. The controller 72 corrects the first value NX and the second value NY to be larger in Step S46. Specifically, the controller 72 corrects the first value NX and the second value NY to be larger, by correcting the crank rotational frequency NA as the reference to "NA−E2," to set the first value NX to "NA−E2+NM" and the second value NY to "NA−E2−NM."

If an assist down signal has not been inputted in Step S44, that is, if neither an assist up signal nor an assist down signal has been inputted, then the controller 72 ends the present step.

The controller 72 exerts the following effects. When the gear shift operating unit 28 is operated, the control system 70 changes the first value NX and the second value NY. Accordingly, the electric transmission 24 can be controlled using a threshold value that is appropriate for the rider.

There are cases in which an upshift signal or a downshift signal is outputted when not intended by the rider, due to a hand hitting the gear shift operating devices 28A, 28B, or the like. The change amount D of the first value NX and the second value NY when the gear shift operating unit 28 is operated is determined based on the operation number of times of the gear shift operating unit 28. The change amount D of the first value NX and the second value NY when the gear shift operating unit 28 is operated is smaller, when the operation number of times of the gear shift operating unit 28 is smaller. Accordingly, the threshold value can be suppressed from changing greatly, when an upshift signal or a downshift signal is outputted when not intended by the rider. Accordingly, the threshold value can be suppressed from becoming a value that is not desired by the rider.

When the first gear shift operating device 28A is consecutively operated, the controller 72 increases the absolute value of the change amount D, as the number of times that the first gear shift operating device 28A has been operated is increased. When the second gear shift operating device 28A is consecutively operated, the controller 72 increases the absolute value of the change amount D, as the number of times that the second gear shift operating device 28B has been operated is increased. When the rider wants to increase the threshold value, since the change amount D of the threshold value is increased by consecutively operating the same gear shift operating device 28A or 28B, it is possible to quickly change the threshold value to be increased. Accordingly, the embodiment is able to contribute to the improvement of the usability.

When the rider wants to shift the range of the crank rotational frequency N in a direction in which the crank rotational frequency N is decreased, the first value NX and the second value NY can be decreased by operating the first gear shift operating device 28A. Accordingly, the crank rotational frequency N will be maintained at a smaller value than before the first gear shift operating device 28A is operated.

When the rider wants to shift the range of the crank rotational frequency N in a direction in which the crank rotational frequency N is increased, the first value NX and the second value NY can be increased by operating the second gear shift operating device 28B. Accordingly, the crank rotational frequency N will be maintained at a larger value than before the second gear shift operating device 28B is operated.

The controller 72 prevents the electric transmission 24 from operating until a predetermined period TX has elapsed after the electric transmission 24 is operated to change the gear ratio γ. Accordingly, upshift and downshift being repeated in a short period of time can be suppressed.

An appropriate crank rotational frequency N is different depending on the control mode. For example, when the control mode is changed to the second mode or to the first mode in a state in which a crank rotational frequency N that the rider feels is appropriate in the third mode is being maintained, there are cases in which discomfort is imparted, such as the pedal 38 feeling heavy. Since the controller 72 sets the first value NX and the second value NY for each control mode, it is possible to reduce the possibility that discomfort is imparted to the rider when the control mode is changed.

The controller 72 corrects the first value NX and the second value NY to become smaller when in a control mode in which the torque t of the assist motor 52 with respect to the manual drive force is larger. Accordingly, when the control mode is changed to a mode in which the torque t is small, even if the crank rotational frequency N is in a range that will not be shifted before the mode change, shifting can be permitted after the mode change; therefore, the pedal 38 feeling heavy to the rider can be suppressed.

Second Embodiment

The second embodiment of the bicycle control apparatus will be described, with reference to FIGS. 6 to 8. The portions that are common to the first embodiment are given the same codes, and the descriptions thereof will be omitted.

Figure 7:
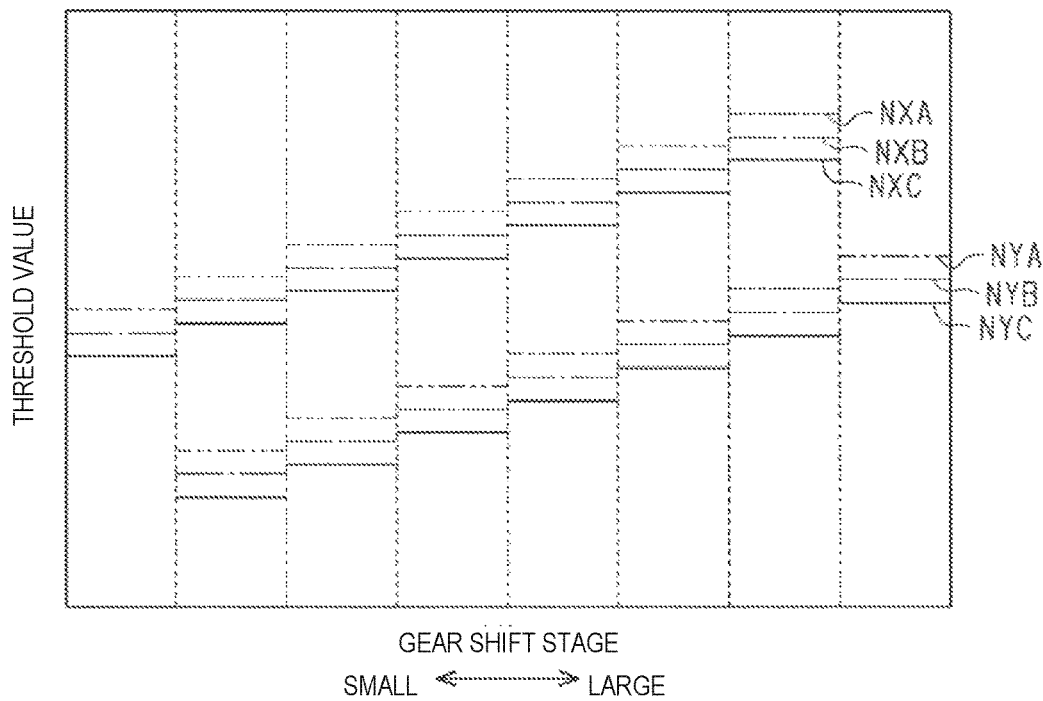
FIG. 7 is a graph showing the relationship between the gear shift stage and the threshold value, which is stored in a storage unit of the control system of a second embodiment.
Figure 8:
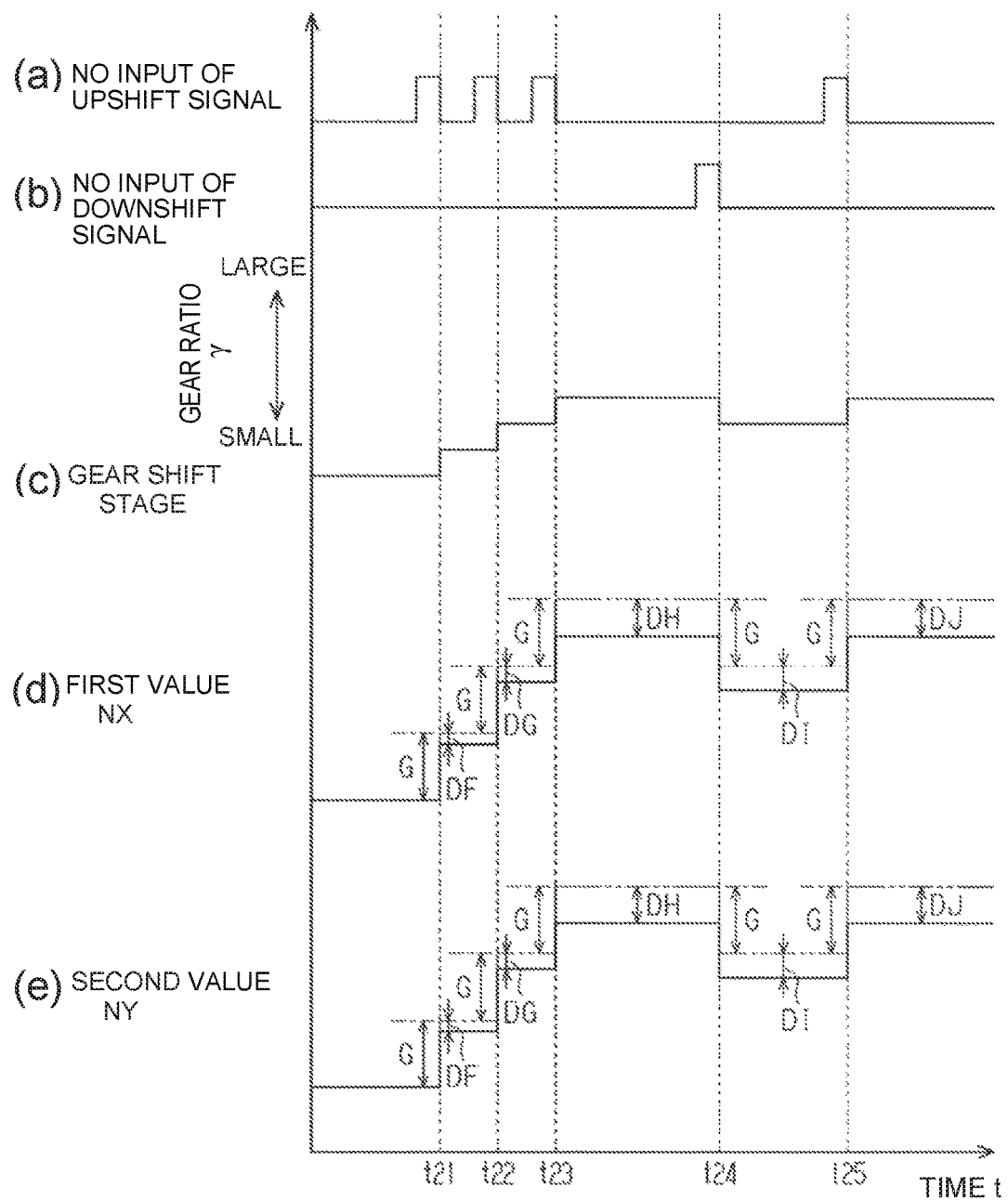
FIG. 8 is a timing chart showing an example of an execution mode of the steps of changing the threshold value of the second embodiment.

As shown in FIG. 7, the first value NX and the second value NY are set for each gear shift stage. The first value NX and the second value NY are set to be increased as the gear shift stage is increased, that is, as the gear ratio γ is increased.

A change amount F of the threshold value corresponding to each gear shift stage is stored in the storage unit 74. The difference in the change amount F of the threshold value between adjacent gear shift stages shall be difference G. Difference G can be configured to be settable by one or both of the operating units 28 and 30 or by an external device. For example, difference G is selected to 5. In this case, for example, in a transmission 24 having gear shift stages from the first stage to the eighth stage, when the change amount F of the threshold value in the eighth stage when the gear ratio γ becomes the largest, the change amount F of the threshold value in the eighth stage will be "0," the change amount F of the threshold value in the seventh stage will be "−5," the change amount F of the threshold value in the sixth stage will be "−10," the change amount F of the threshold value in the fifth stage will be "−15," the change amount F of the threshold value in the fourth stage will be "−20," the change amount F of the threshold value in the third stage will be "−25," the change amount F of the threshold value in the second stage will be "−30," and the change amount F of the threshold value in the first stage will be "−35." Therefore, for example, the crank rotational frequency NA which becomes the reference in the eighth stage becomes "NA" and the crank rotational frequency NA which becomes the reference in the first stage becomes "NA−35." In this case, the controller 72 corrects the crank rotational frequency NA which becomes the reference corresponding to the first stage to "NA−35," sets the first value NX to "NA−35+NM," and sets the second value NY to "NA−35−NM." The first value NX and the second value NY which are set in advance corresponding to the gear shift stage are values that are determined by the crank rotational frequency NA that becomes the reference, the change amount F of the threshold value that corresponds to each gear shift stage, and the predetermined range of the rotational frequency (±NM).

One example of the execution mode of the change steps will be described with reference to FIG. 8. In portions (d) and (e) of FIG. 8, the chain double-dashed line represents the first value NX and the second value NY which are set in advance corresponding to the gear shift stage, and the solid line represents the first value NX and the second value NY after being corrected according to the number of times that an upshift signal has been inputted. In FIG. 8, an execution mode of the shifting steps is shown, in which the control mode is not changed, but, for example, fixed in the third mode.

Time t21 indicates the time at which an upshift signal is inputted to the controller 72 and the count of the number of times that an upshift signal has been inputted becomes "1." At this time, the controller 72 increases the gear shift stage by one stage. Further, the controller 72 changes the first value NX and the second value NY based on the change amount F of the threshold value corresponding to the gear shift stage, the crank rotational frequency NA which is set in advance, the predetermined range of the rotational frequency (±NM), and the change amount D based on the number of times of shifting. The change amount D based on the number of times of shifting is a value that accumulates the change amount of the threshold value corresponding to the number of times that an upshift signal has been inputted and the change amount of the threshold value corresponding to the number of times that a downshift signal has been inputted. At a time before time t21 in FIG. 8, the change amount D based on the number of times of shifting is set to be "0."

Time t22 indicates the time at which an upshift signal is inputted to the controller 72 and the count of the number of times that an upshift signal has been inputted becomes "2." At this time, the controller 72 increases the gear shift stage by one stage. Further, the controller 72 changes the first value NX and the second value NY based on the change amount F of the threshold value corresponding to the gear shift stage, the crank rotational frequency NA which is set in advance, the predetermined range of the rotational frequency (±NM), and the change amount D. Since upshift is carried out in succession at time t21 and time t22, the absolute value of the change amount DG corresponding to the number of times of shifting at time t22 is greater than the absolute value of the change amount DF corresponding to the number of times of shifting at time t21.

Time t23 indicates the time at which an upshift signal is inputted to the controller 72 and the count of the number of times that an upshift signal has been inputted becomes "3." At this time, the controller 72 increases the gear shift stage by one stage. Further, the controller 72 changes the first value NX and the second value NY based on the change amount F of the threshold value corresponding to the gear shift stage, the crank rotational frequency NA which is set in advance, the predetermined range of the rotational frequency (±NM), and the change amount D. Since upshift is carried out in succession at time t21, time t22, and time t23, the absolute value of the change amount DH corresponding to the number of times of shifting at time t23 is greater than the absolute value of the change amount DG corresponding to the number of times of shifting at time t22.

Time t24 indicates the time at which a downshift signal is inputted to the controller 72 and the count of the number of times that a downshift signal has been inputted becomes "1." At this time, the controller 72 decreases the gear shift stage by one stage. Further, the controller 72 initializes the count of the number of times that an upshift signal has been inputted to "0." Further, the controller 72 changes the first value NX and the second value NY based on the change amount F of the threshold value corresponding to the gear shift stage, the crank rotational frequency NA which is set in advance, the predetermined range of the rotational frequency (±NM), and the change amount D based on the number of times of shifting. The absolute value of the change amount DI corresponding to the number of times of shifting at time t24 is less than the absolute value of the change amount DH corresponding to the number of times of shifting at time t23, and greater than the absolute value of the change amount DG corresponding to the number of times of shifting at time t22.

Time t25 indicates the time at which an upshift signal is inputted to the controller 72 and the count of the number of times that an upshift signal has been inputted becomes "1." At this time, the controller 72 initializes the count of the number of times that a downshift signal has been inputted to "0." Additionally, the controller 72 increases the gear shift stage by one stage. Further, the controller 72 changes the first value NX and the second value NY based on the change amount F of the threshold value corresponding to the gear shift stage, the crank rotational frequency NA which is set in advance, the predetermined range of the rotational frequency (±NM), and the change amount D based on the number of times of shifting. The absolute value of the change amount DJ corresponding to the number of times of shifting at time t25 is equal to the absolute value of the change amount DH corresponding to the number of times of shifting at time t23.

Figure 6:
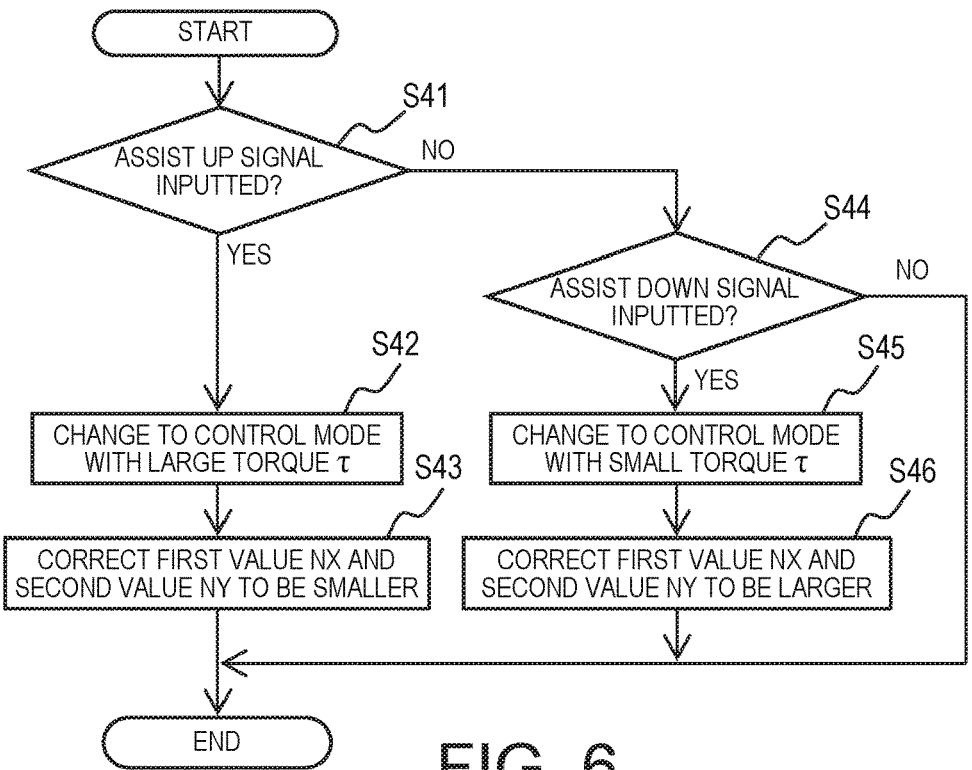
FIG. 6 is a flowchart of the switching steps of the control mode that is executed by the controller of FIG. 2.

The controller 72 of the present embodiment changes the first value NX and the second value NY based on the change amount F of the threshold value corresponding to the gear shift stage and the change amount D of the threshold value based on the number of times of shifting, in Step S43 of the switching steps of the control mode of the assist mechanism 20 shown in FIG. 6. As a result, for example, when the control mode is changed from the first mode to the second mode in Step S42, as shown in FIG. 7, the first value NX corresponding to each gear shift stage is corrected from the first value NXA to the first value NXB, and the second value NY corresponding to each gear shift stage is corrected from the second value NYA to the second value NYB. Further, for example, when the control mode is changed from the second mode to the third mode in Step S42, the first value NX and the second value NY corresponding to each gear shift stage are corrected from the first value NXB to the first value NXC, and the second value NY corresponding to each gear shift stage is corrected from the second value NYB to the second value NYC.

The controller 72 changes the first value NX and the second value NY based on the change amount F of the threshold value corresponding to the gear shift stage and the change amount D of the threshold value based on the number of times of shifting, in Step S45 of the switching steps of the control mode of the assist mechanism 20 shown in FIG. 6. As a result, for example, when the control mode is changed from the third mode to the second mode in Step S44, as shown in FIG. 7, the first value NX and the second value NY corresponding to each gear shift stage are corrected from the first value NXC to the first value NXB, and the second value NY corresponding to each gear shift stage is corrected from the second value NYC to the second value NYB. Further, for example, when the control mode is changed from the second mode to the first mode in Step S45, the first value NX and the second value NY corresponding to each gear shift stage are corrected from the first value NXB to the first value NXA, and the second value NY corresponding to each gear shift stage is corrected from the second value NYB to the second value NYA.

Third Embodiment

Figure 9:
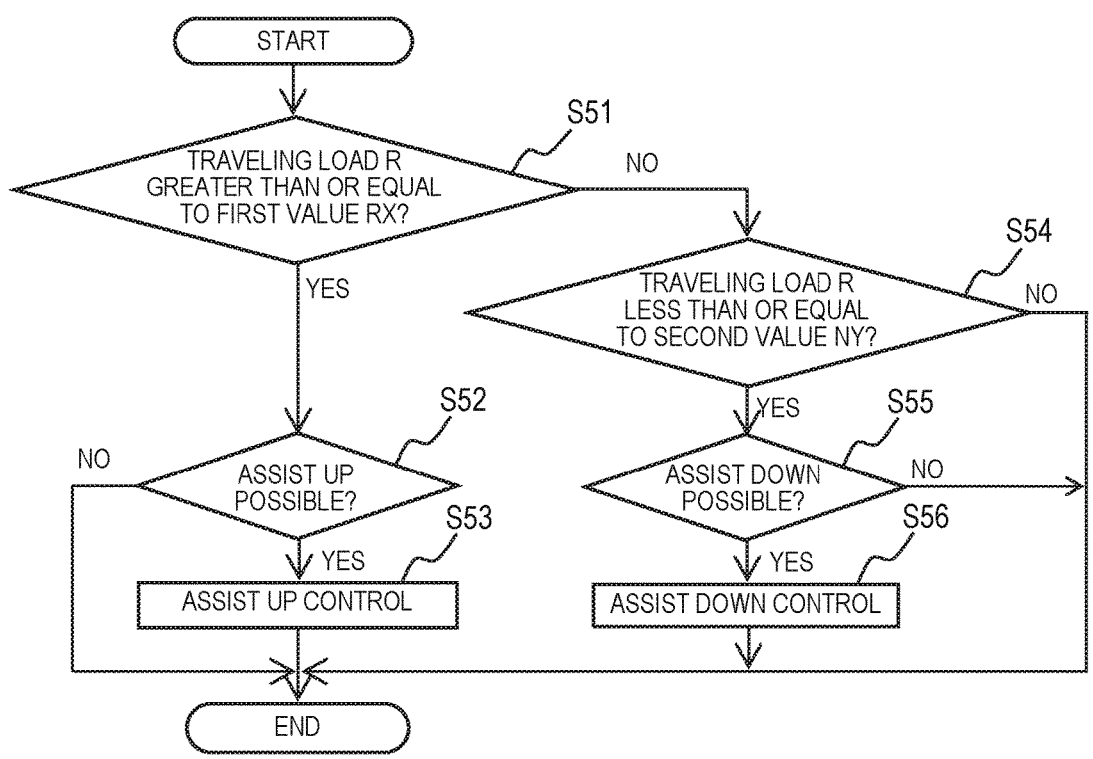
FIG. 9 is a flowchart of the steps of changing the control mode that is executed by the controller of the control system of the second embodiment.
Figure 10:
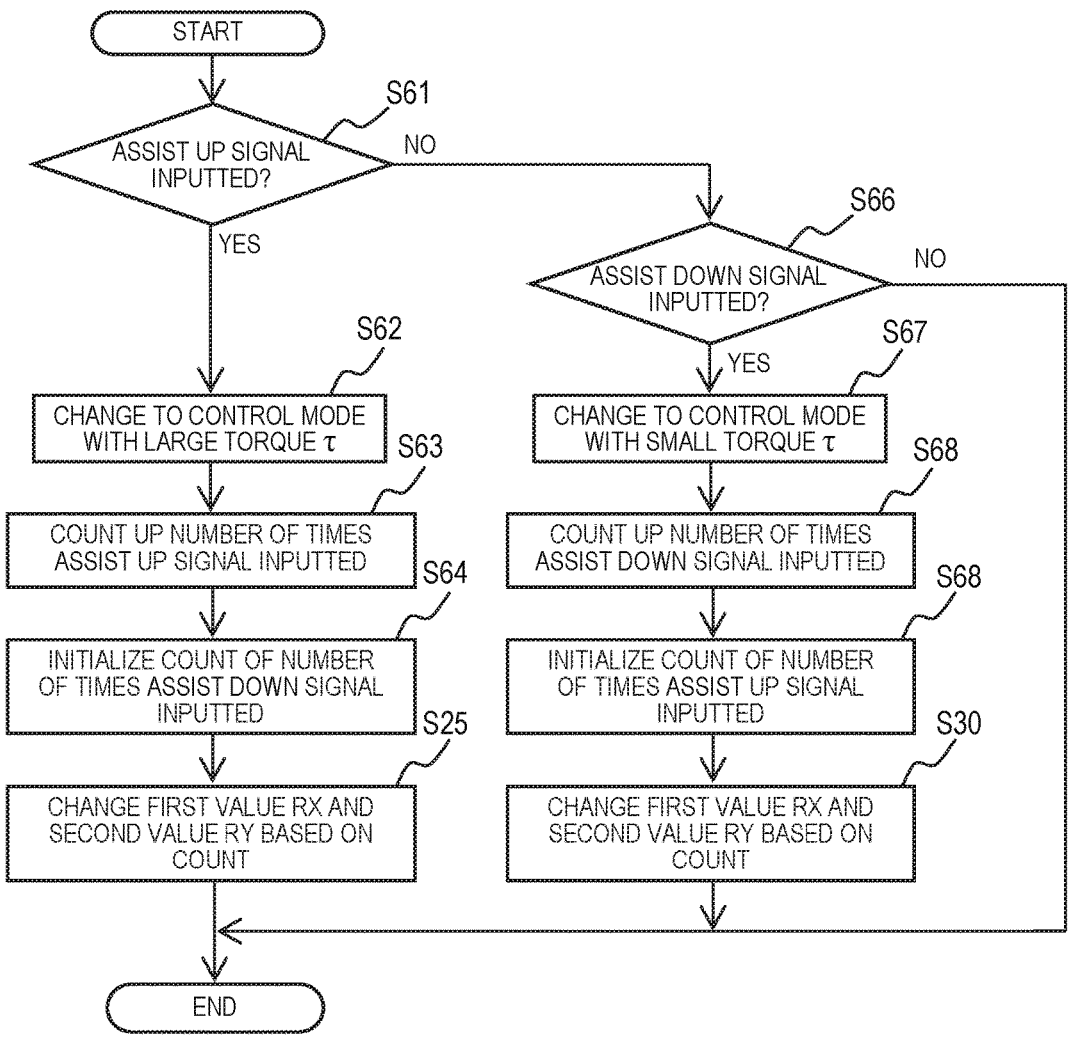
FIG. 10 is a flowchart of the steps of changing the threshold value that is executed by the controller of the control system of the second embodiment.

The third embodiment of the bicycle control apparatus will be described, with reference to FIGS. 9 to 10. The portions that are common to the first embodiment are given the same codes, and the descriptions thereof will be omitted. In the present embodiment, the assist motor 52 is a bicycle component. Further, the traveling load R is a parameter representing the running state of the bicycle 10. In addition, the assist operating unit 30 is an operating unit, the first assist operating device 30A is the first operating unit, and the second assist operating device 30B is the second operating unit.

The controller 72 controls the electric transmission 24 based on a threshold value and the traveling load R. The threshold value includes a first value RX, and a second value RY that is smaller than the first value RX. The controller 72 changes the control mode of the assist mechanism 20 based on a comparison result between the traveling load R and the first value RX as well as the first value RX. The traveling load R is determined by subtracting the energy that is outputted from the energy that is inputted. The energy that is inputted can be calculated from values of a torque sensor 26 and a cadence sensor that detects the rotation of the crankshaft 46. The energy that is outputted can be calculated from the weights of the bicycle 10 and the rider, and the value of a vehicle speed sensor 64. Regarding the weights of the bicycle 10 and the rider, predetermined weights can be set in advance, inputted by the rider, or displayed on a display unit (not shown) to be selected by the rider.

The control mode changing steps that are executed by the controller 72 will be described with reference to FIG. 9. The present steps are repeatedly executed every predetermined cycle while an assisting control for assisting the manual drive force is being executed.

The controller 72 determines whether or not the traveling load R is greater than or equal to the first value RX in Step S51. When the traveling load R is greater than or equal to the first value RX, the controller 72 proceeds to Step S52. In Step S52, the controller 72 determines whether or not assist up is possible. If assist up is determined to be possible, then an assist up control is executed in Step S53 to change to a control mode in which the torque τ with respect to the manual drive force is large, and the present step is ended. When the traveling load R is greater than or equal to the first value RX, the controller 72 controls the assist motor 52 so as to increase the torque τ of the assist motor 52. When the controller 72 determines that assist up is not possible in Step S52, the present step is ended. For example, when set to other than the control mode in which the torque τ with respect to the manual drive force is the largest, the controller 72 determines that assist up is possible.

If the traveling load R is less than the first value RX, then the controller 72 determines whether or not the traveling load R is less than or equal to the second value RY, in Step S54. When the traveling load R is less than or equal to the second value RY, the controller 72 proceeds to Step S55. In Step S55, the controller 72 determines whether or not assist down is possible. If assist down is determined to be possible, then an assist down control is executed in Step S56 to change to a control mode in which the torque τ with respect to the manual drive force is small, and the present step is ended. When the traveling load R is less than or equal to the second value RY, the controller 72 controls the assist motor 52 so as to decrease the torque τ of the assist motor 52. When other than a control mode in which the assist motor 52 does not perform an assist is set, the controller determines that assist down is possible.

If the traveling load R is greater than the second value RY in Step S54, that is, if the traveling load R falls within the range from the first value RX to the second value RY, then the controller 72 does not change the control mode, and ends the present step.

If the first assist operating device 30A is operated when the traveling load R is within the range from the first value RX to the second value RY, then the controller 72 controls the assist motor 52 so as to increase the torque τ. If the second assist operating device 30B is operated when the traveling load R is within the range from the first value RX to the second value RY, then the controller 72 controls the assist motor 52 so as to decrease the torque τ.

When the assist operating unit 30 is operated, the controller 72 changes the threshold value. More specifically, the controller 72 decreases the first value RX and the second value RY when the first assist operating device 30A is operated, and increases the first value RX and the second value RY when the second assist operating device 30B is operated. When the first assist operating device 30A is operated, the controller 72 changes the first value RX and the second value RY so that the change amount D of the first value RX and the change amount D of the second value RY become equal. When the second assist operating device 30B is operated, the controller 72 changes the first value RX and the second value RY so that the change amount D of the first value RX and the change amount D of the second value RY become equal.

Further, the change amount D of the threshold value is determined based on the operating state of the assist operating devices 30A and 30B. In the present embodiment, the operating state of the assist operating devices 30A and 30B is the operation number of times of the assist operating devices 30A and 30B. More specifically, the change amount D of the threshold value when the assist operating devices 30A and 30B are operated is determined based on the operation number of times of the assist operating devices 30A and 30B. That is, when the assist operating devices 30A and 30B are operated, the controller 72 changes the first value RX and the second value RY based on the number of times that the assist operating devices 30A and 30B have been operated. Specifically, when the first assist operating device 30A is consecutively operated, the controller 72 increases the absolute value of the change amount D of the first value RX and the second value RY, as the number of times that the first assist operating device 30A has been inputted is increased. When the second assist operating device 30B is consecutively operated, the controller 72 increases the absolute value of the change amount D of the first value RX and the second value RY, as the number of times that the second assist operating device 30B has been inputted is increased.

The controller 72 counts up the number of times that one of the first assist operating device nit 30A and the second assist operating device 30B has been operated, from the time when one of the first assist operating device 30A and the second assist operating device 30B is operated until the other of the first assist operating device 30A and the second assist operating device 30B is operated. Then, the controller 72 initializes the number of times that one of the first assist operating device 30A and the second assist operating device 30B has been operated, when the other of the first assist operating device 30A and the second assist operating device 30B is operated after one of the first assist operating device 30A and the second assist operating device 30B is inputted.

The steps of changing the threshold value will be described with reference to FIG. 10. The controller 72 determines whether or not an assist up signal has been inputted from the first assist operating device 30A (refer to FIG. 2) in Step S61. When an assist up signal has been inputted, the controller 72 executes an assist up control in Step S62. When set to the control mode in which the torque τ with respect to the manual drive force is the largest in Step S62, the controller 72 maintains the control mode in which the torque τ with respect to the manual drive force is the largest. The controller 72 counts up the number of times that an assist up signal has been inputted in Step S63. The controller 72 initializes the count of the number of times that an assist down signal has been inputted in Step S64. The controller 72 changes the first value RX and the second value RY to be smaller, based on the count of the number of times that an assist up signal has been inputted, in Step S65. The change amount D of the first value RX and the second value RY are, for example, set to be doubled each time the count is increased by "1."

If an assist up signal is determined to not have been inputted in Step S61, then the controller 72 determines whether or not an assist down signal has been inputted from the second assist operating unit 30B (refer to FIG. 2) in Step S66. If an assist down signal is determined to not have been inputted in Step S66, then the controller 72 ends the present step.

When an assist down signal has been inputted, the controller 72 executes an assist down control in Step S67. When set to the control mode in which the torque τ with respect to the manual drive force is the smallest in Step S67, the controller 72 can maintain the control mode in which the torque with respect to the manual drive force is the smallest, or change to a control mode in which the assist motor 52 does not perform an assist. When a control mode in which the assist motor 52 does not perform an assist is set, the control mode in which the assist motor 52 does not perform an assist is maintained. The controller 72 counts up the number of times that an assist down signal has been inputted in Step S68. The controller 72 clears the count of the number of times that an assist up signal has been inputted in Step S69. The controller 72 changes the first value RX and the second value RY to be larger, based on the count of the number of times that an assist down signal has been inputted, in Step S70. The change amount D of the first value RX and the second value RY are, for example, set to be doubled each time the count is increased by "1." The controller 72 accumulates and stores the change amount D of the first value RX and the second value RY. That is, if the first value RX and the second value RY are decreased by a change amount D3 after which the changed first value RX and second value RY are increased by a change amount D4, then the controller 72 stores "D3+D4" as the change amount D in the storage unit 74. According to the control system 70 of the third embodiment, an effect according to the control system 70 of the first embodiment can be exerted.

The specific form that the present bicycle control system can take is not limited to the forms illustrated in the above-described embodiment. The present bicycle control system can take various forms different from the above-described embodiment. The modified example of the above-described embodiment shown below is one example of the various forms that the present bicycle control system can take.

In the steps of changing the threshold value of the first embodiment, when an upshift signal or a downshift signal is inputted, only the changing of the first value NX and the second value NY can be carried out, without executing an upshift control and a downshift control.

In the steps of changing the threshold value of the third embodiment, when an assist up signal or an assist down signal is inputted, only the changing of the first value RX and the second value RY can be carried out, without executing an assist up control and an assist down control.

In the third embodiment, the traveling load R can be calculated based on an output of a tilt sensor, by providing a tilt sensor to the bicycle 10. When the bicycle 10 is traveling on a large uphill slope, a pitch angle of the bicycle 10 that is calculated based on the output of the tilt sensor is increased. Accordingly, the controller 72 determines that the traveling load R is greater than or equal to the first value RX when the pitch angle is greater than a first predetermined angle, and determines that the traveling load R is less than or equal to the second value RY when the pitch angle is less than a second predetermined angle.

In the steps of changing the threshold value of each of the embodiments, the first value NX and the second value NY can be changed based on the operation time of the operating devices 28A, 28B, 30A and 30B. In this case, the operation time is the control state of the operating unit. For example, the controller 72 executes the step of Step S81 shown in FIG. 11, instead of Steps S23-S25 shown in FIG. 4. The controller 72 changes the first value NX and the second value NY to be smaller, based on the operation time of the gear shift operating device 28A, in Step S81. In this case, the operating unit 28 continuously outputs an upshift signal to the controller 72 while the first gear shift operating device 28A is being operated. Further, the operating unit 28 outputs information based on the time that the first gear shift operating device 28A is operated, along with the upshift signal, to the controller 72. For example, the controller 72 increases the change amount D of the first value NX and the second value NY as the operation time is increased.

Figure 4:
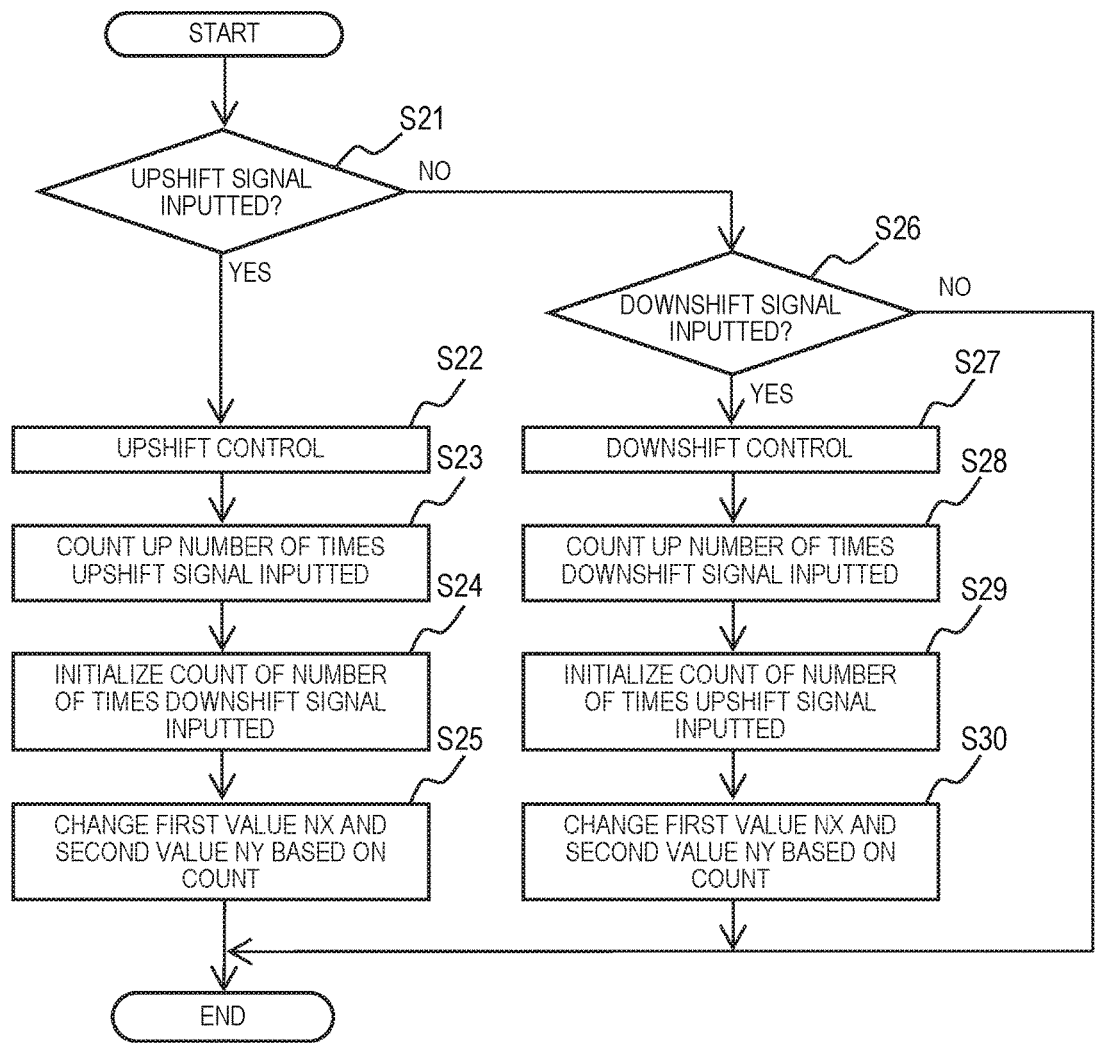
FIG. 4 is a flowchart of the steps of changing the threshold value executed by the controller of FIG. 2.
Figure 11:
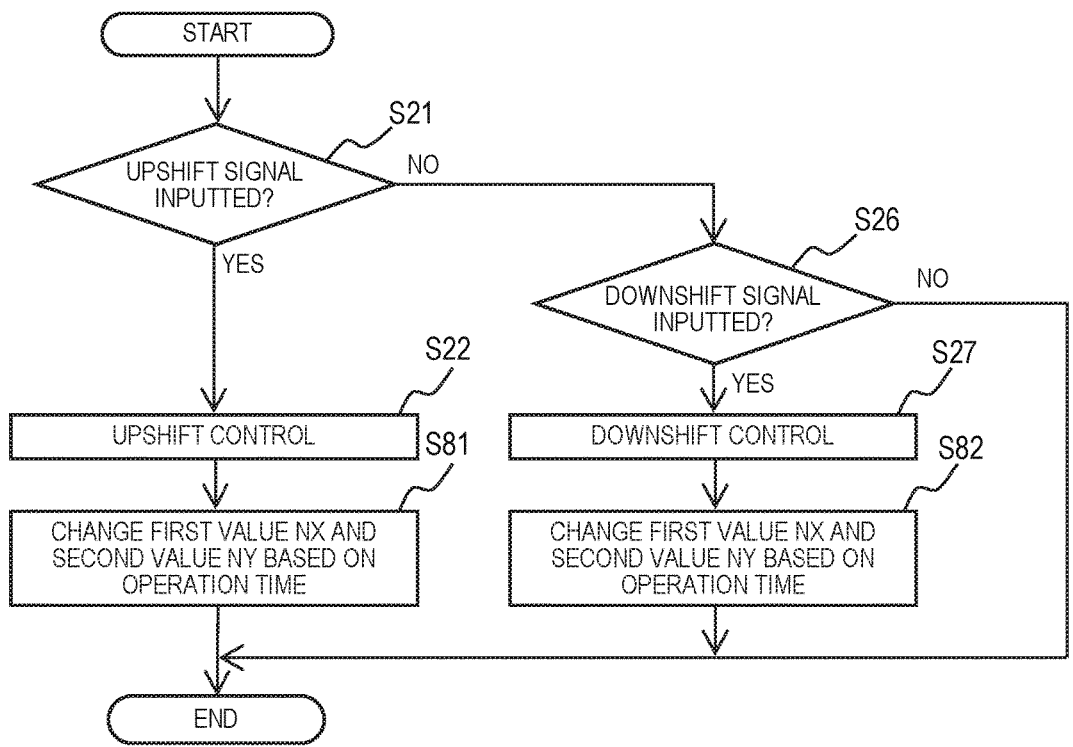
FIG. 11 is a flowchart of the shifting steps of a first modified example.

Further, the controller 72 executes the step of Step S82 shown in FIG. 11, instead of Steps S28-S30 shown in FIG. 4. The controller 72 changes the first value NX and the second value NY to be larger, based on the operation time of the gear shift operating device 28B, in Step S82. In this case, the operating unit 28 continuously outputs a downshift signal to the controller 72 while the second gear shift operating device 28B is being operated. Further, the operating unit 28 outputs information based on the time that the second gear shift operating device 28B is operated, along with the downshift signal, to the controller 72. For example, the controller 72 increases the change amount D of the first value NX and the second value NY as the operation time is increased.

In the steps of changing the threshold value of each of the embodiments, the first value NX and the second value NY can be changed based on the operation amount of the operating devices 28A, 28B, 30A and 30B. In this case, the operation amount is the control state of the operating unit. The operating devices 28A, 28B, 30A and 30B are formed of for example, levers, and are capable of outputting a signal corresponding to the operation amount of the lever to the controller 72. For example, the controller 72 executes the step of Step S91 shown in FIG. 12, instead of Steps S23-S25 shown in FIG. 4. The controller 72 changes the first value NX and the second value NY to be smaller, based on the operation amount of the gear shift operating device 28A, in Step S91. For example, the controller 72 increases the change amount D of the first value NX and the second value NY as the operation amount is increased.

Figure 12:
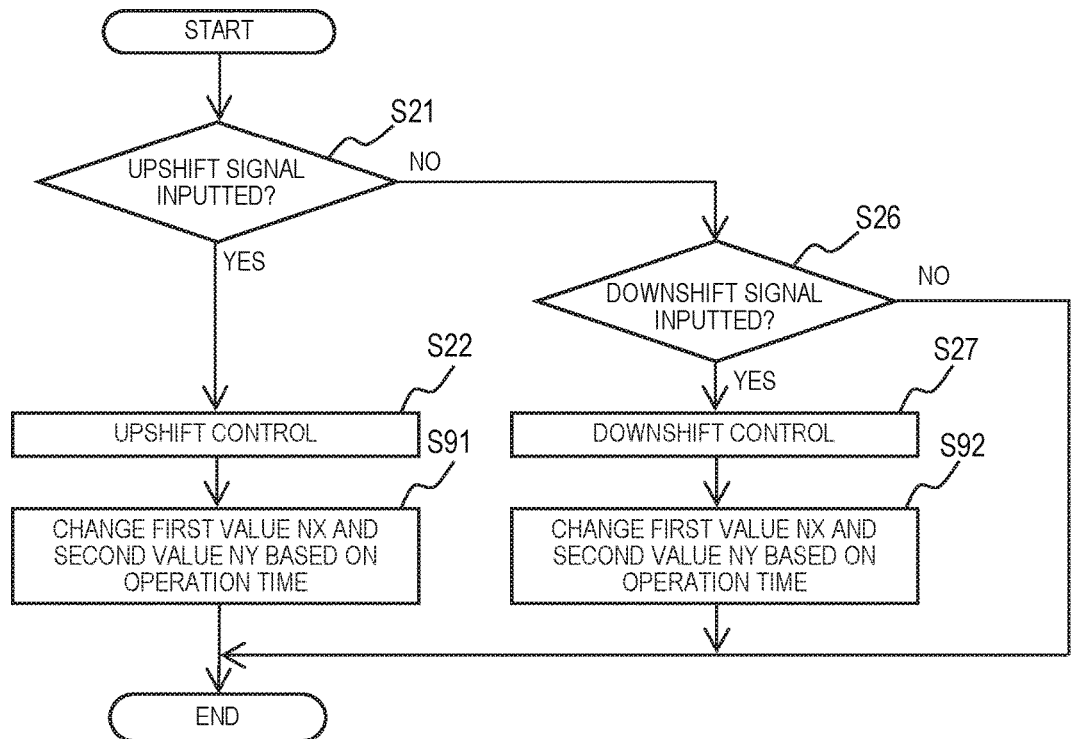
FIG. 12 is a flowchart of the shifting steps of a second modified example.

Further, the controller 72 executes the step of Step S92 shown in FIG. 12, instead of Steps S28-S30 shown in FIG. 4. The controller 72 changes the first value NX and the second value NY to be larger, based on the operation amount of the gear shift operating device 28B, in Step S92. For example, the controller 72 increases the change amount D of the first value NX and the second value NY as the operation amount is increased.

Figure 13:
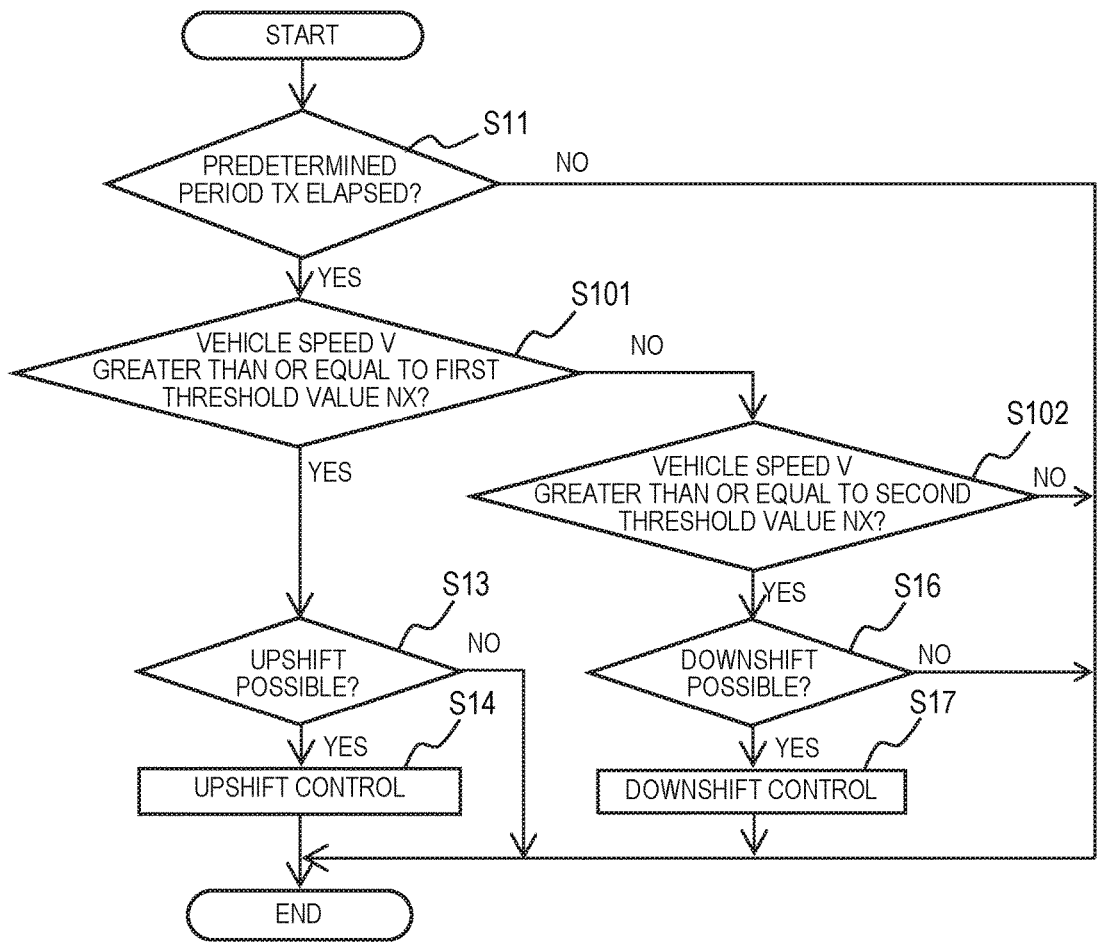
FIG. 13 is a flowchart of the shifting steps of a third modified example.

In the shifting steps, vehicle speed V can be used instead of the crank rotational frequency N. In this case, the parameter related to the running state of the bicycle 10 is the vehicle speed V. The storage unit 74 stores a first value VX and a second value VY related to the vehicle speed V. A step that uses the vehicle speed V will be described using a modified example of the shifting steps shown in FIG. 13. The controller 72 determines whether or not the vehicle speed V is greater than or equal to the first value VX in Step S101. When the vehicle speed V is greater than or equal to the first value VX, the controller 72 carries out an upshift control in Step S13. That is, if the vehicle speed V is greater than or equal to the first value VX, then the controller 72 controls the electric transmission 24 so that the gear ratio γ is increased. If the vehicle speed V is less than the first value VX, then the controller 72 determines whether or not the vehicle speed V is less than or equal to the second value VY in Step S102. When the vehicle speed V is less than the second value VY, the controller 72 carries out a downshift control in Step S66. That is, if the vehicle speed V is less than or equal to the second value VY, then the controller 72 controls the electric transmission 24 so that the gear ratio γ is decreased. If the vehicle speed V is greater than the second value VY in Step S102, that is, if the vehicle speed V is within a range from the first value VX to the second value VY, then the controller 72 does not perform an upshift control or a downshift control.

The vehicle speed detection device 60 can also be configured as a GPS (Global Positioning System) receiver. In this case, the vehicle speed V is calculated based on positional information and travel time. The vehicle speed detection device 60 can be changed to a cadence sensor that outputs a signal according to the rotational speed of the crankshaft 46 which reflects the vehicle speed V. In this case, the crank rotational frequency N is calculated based on the output of the cadence sensor. The cadence sensor is provided to the crankshaft 46 shown in FIG. 1 or in the vicinity of the crank arm 48. The cadence sensor comprises an element that outputs a value corresponding to a change in the relative position between the sensor and a magnet that is provided to the crankshaft 46 or the crank arm 48 and therewith, and outputs a signal corresponding to the crankshaft 46 or the crank arm 48. The controller 72 calculates the rotational frequency of the crankshaft 46 per unit of time (crank rotational frequency N), based on a signal that is outputted by the cadence sensor.

In this case, the vehicle speed detection device 60 can calculate the rotational speed of the crankshaft 46 based on the vehicle speed V, and can calculate the crank rotational frequency N based on the output of the cadence sensor. Especially, when coasting, the vehicle speed V is greater than "0" but the crank rotational frequency N detected by the cadence sensor will be "0" so it is preferable to calculate the crank rotational frequency N based on the vehicle speed V. That is, the controller 72 can use the crank rotational frequency N corresponding to the vehicle speed V, when the actual crank rotational frequency N that is detected by the cadence sensor is less than the crank rotational frequency N that corresponds to the vehicle speed V.

The electric transmission 24 can be changed to an internal electric transmission 24 that is provided around the crankshaft 46. Further, the electric transmission 24 can be changed to an external type transmission that switches the chain 44 from one rear sprocket 42 to another, from among a plurality of rear sprockets 42. Further, the electric transmission 24 can be changed to an external type transmission that switches the chain 44 from one front sprocket 50 to another, from among a plurality of front sprockets 50.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element sentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the eudrem/it is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle control system comprising:
a controller that includes a processor; and
a memory device,
the bicycle control system being configured to be operatively connected to a bicycle component, at least one sensor, and an operating unit of a bicycle,
the controller being configured to receive a detection signal from the at least one sensor indicating a parameter related to a running state of the bicycle, compare the parameter to a threshold value, and control the bicycle component based on the result of comparison,
the controller being further configured to control the bicycle component in response an operation signal from the operating unit,
the controller being further configured to change the threshold value by a change amount after controlling the bicycle component, the controller determining the change amount based on at least one from among an operation number of times of the operating unit, an operation time of the operating unit, and an operation amount of the operating unit.

2. The bicycle control system as recited in claim 1, wherein
the operating unit comprises a first operating unit and a second operating unit, and
the controller is configured to decrease the threshold value when the first operating unit is operated and increase the threshold value when the second operating unit is operated.

3. The bicycle control system as recited in claim 2, wherein
the controller is configured to count up a number of times that one of the first operating unit and the second operating unit has been operated, from a time when one of the first operating unit and the second operating unit is operated until the other of the first operating unit and the second operating unit is operated.

4. The bicycle control system as recited in claim 3, wherein
the controller is configured to initialize the number of times that one of the first operating unit and the second operating unit has been operated, when the other of the first operating unit and the second operating unit is operated after one of the first operating unit and the second operating unit is inputted.

5. The bicycle control system as recited in claim 2, wherein
the threshold value includes a first value, and a second value that is smaller than the first value, and
the controller is configured to decrease at least one of the first value and the second value when the first operating unit is operated, and increase at least one of the first value and the second value when the second operating unit is operated.

6. The bicycle control system as recited in claim 5, wherein
the controller is configured to change the first value and the second value so that the change amount of the first value and the change amount of the second value become equal, when the first operating unit is operated, and change the first value and the second value so that the change amount of the first value and the change amount of the second value become equal, when the second operating unit is operated.

7. The bicycle control system as recited in claim 1 wherein
the operating unit comprises a first operating unit and a second operating unit,
the controller is configured to decrease the threshold value when the first operating unit is operated and increase the threshold value when the second operating unit is operated,
the change amount of the threshold value is determined based on the operation number of times of the operating unit, and
the controller increases an absolute value of the change amount of the threshold value as the number of times that the first operating unit has been inputted is increased, when the first operating unit is consecutively operated, and increases the absolute value of the change amount of the threshold value as the number of times that the second operating unit has been operated is increased, when the second operating unit is consecutively operated.

8. The bicycle control system as recited in claim 1, wherein
the bicycle component is an electric transmission that changes the gear ratio of the bicycle.

9. The bicycle control system as recited in claim 8, wherein the threshold value includes a first value, and a second value that is smaller than the first value, the controller is configured to decrease at least one of the first value and the second value when the first operating unit is operated, and increase at least one of the first value and the second value when the second operating unit is operated, the parameter related to the running state of the bicycle is a vehicle speed of the bicycle, and the controller is configured to control the electric transmission so that the gear ratio of the bicycle is increased when the vehicle speed of the bicycle is greater than or equal to the first value, and control the electric transmission so that the gear ratio of the bicycle is decreased when the vehicle speed of the bicycle is less than or equal to the second value.

10. The bicycle control system as recited in claim 9, wherein the controller is configured to control the electric transmission so that the gear ratio of the bicycle is increased when the first operating unit is operated, and control the electric transmission so that the gear ratio of the bicycle is decreased when the second operating unit is operated.

11. The bicycle control system as recited in claim 8, wherein the threshold value includes a first value, and a second value that is smaller than the first value, the controller is configured to decrease at least one of the first value and the second value when the first operating unit is operated, and increase at least one of the first value and the second value when the second operating unit is operated, the parameter related to the running state of the bicycle is a crank rotational frequency of the bicycle, and the controller is configured to control the electric transmission so that the gear ratio of the bicycle is increased when the crank rotational frequency of the bicycle is greater than or equal to the first value, and control the electric transmission so that the gear ratio of the bicycle is decreased when the crank rotational frequency of the bicycle is less than or equal to the second value.

12. The bicycle control system as recited in claim 8, wherein the controller is configured to prevent the electric transmission from operating until a predetermined period has elapsed after causing the electric transmission to operate to change the gear ratio.

13. The bicycle control system as recited in claim 8, wherein the threshold value includes a first value, and a second value that is smaller than the first value, the controller is configured to decrease at least one of the first value and the second value when the first operating unit is operated, and increase at least one of the first value and the second value when the second operating unit is operated, the bicycle further comprises an assist motor for assisting a manual drive force which is inputted to the bicycle, and the controller comprises a plurality of control modes having different magnitudes of a torque of the assist motor with respect to the manual drive force, and, when changing the control mode, the controller is configured to correct the first value and the second value in accordance with the control mode.

14. The bicycle control system as recited in claim 13, wherein the first value and the second value are corrected to become smaller when in the control mode in which the torque of the assist motor with respect to the manual drive force is larger.

15. A bicycle control system comprising:

a controller that includes a processor; and a memory device, the bicycle control system being configured to be operatively connected to an assist motor, at least one sensor, and an operating unit of a bicycle, the assist motor being configured and arranged to assist a manual drive force that is inputted to the bicycle, the controller being configured to receive a detection signal from the at least one sensor indicating a parameter related to a running state of the bicycle, and compare the parameter to a threshold value, and control the assist motor based on the result of comparison, the controller being further configured to control the assist motor in response an operation signal from the operating unit, the controller being configured to change the threshold value by a change amount after controlling the assist motor.

16. The bicycle control system as recited in claim 15, wherein the threshold value includes a first value, and a second value that is smaller than the first value, the controller is configured to decrease at least one of the first value and the second value when the first operating unit is operated, and increase at least one of the first value and the second value when the second operating unit is operated, the parameter related to the running state of the bicycle is a traveling load of the bicycle, and the controller is configured to control the assist motor so that the torque of the assist motor is increased when the traveling load of the bicycle is greater than the first value, and control the assist motor so that the torque of the assist motor is decreased when the traveling load of the bicycle is less than the second value.

17. The bicycle control system as recited in claim 16, wherein the controller is configured to control the assist motor so that the torque of the assist motor is decreased if the first operating unit is operated when the traveling load of the bicycle is within a range from the first value to the second value, and control the assist motor so that the torque of the assist motor is increased if the second operating unit is operated when the traveling load of the bicycle is within a range from the first value to the second value.

18. A bicycle system comprising:

a controller that includes a processor;

a memory device; and at least one sensor configured to detect a parameter related to a running state of a bicycle, the bicycle system being configured to be operatively connected to a bicycle component of the bicycle, the at least one sensor, and an operating unit of the bicycle, the controller being configured to receive a detection signal from the at least one sensor indicating the parameter, compare the parameter to a threshold value, and control the bicycle component based on the result of comparison, the controller being further configured to control the bicycle component in response an operation signal from the operating unit, the controller being further configured to change the threshold value by a change amount after controlling the bicycle component, the controller determining the change amount based on at least one from among an operation number of times of the operating unit, an operation time of the operating unit, and an operation amount of the operating unit.

* * * * *